(12) United States Patent
Liu

(10) Patent No.: US 10,310,330 B2
(45) Date of Patent: Jun. 4, 2019

(54) BACKLIGHT MODULE AND LIQUID CRYSTAL DISPLAY DEVICE

(71) Applicant: Wuhan China Star Optoelectronics Technology Co., Ltd., Wuhan (CN)

(72) Inventor: Zhongjie Liu, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 53 days.

(21) Appl. No.: 15/566,710

(22) PCT Filed: Apr. 18, 2017

(86) PCT No.: PCT/CN2017/080949
§ 371 (c)(1),
(2) Date: Oct. 15, 2017

(87) PCT Pub. No.: WO2018/166034
PCT Pub. Date: Sep. 20, 2018

(65) Prior Publication Data
US 2019/0049794 A1 Feb. 14, 2019

(30) Foreign Application Priority Data
Mar. 17, 2017 (CN) .......................... 2017 1 0159776

(51) Int. Cl.
*A61K 31/198* (2006.01)
*G02F 1/1335* (2006.01)
*F21V 8/00* (2006.01)

(52) U.S. Cl.
CPC ....... *G02F 1/133608* (2013.01); *G02B 6/009* (2013.01); *G02B 6/0055* (2013.01); *G02B 6/0085* (2013.01); *G02B 6/0088* (2013.01); *G02F 2001/133628* (2013.01)

(58) Field of Classification Search
CPC ...... A61K 31/198; A61K 45/06; A61K 47/44; A61K 47/24; A61K 9/107; A61K 9/127; A61P 37/00; G01N 33/5088; G01N 2333/435
See application file for complete search history.

(56) References Cited

U.S. PATENT DOCUMENTS 9,594,208 B2 * 3/2017 Zhou ..................... G02B 6/005

* cited by examiner

*Primary Examiner* — David V Bruce

(57) ABSTRACT

A backlight module and liquid crystal display device are provided. The backlight module comprises a plastic frame, a reflection sheet, a light guide plate, a light source element, a hole glue and a heat dissipating element. The plastic frame comprises a first frame and a second frame disposed opposite each other. The heat dissipating element is disposed on the light source element, extending along an outer side surface of the first frame to a bottom portion of the reflection sheet, and is bonded to the corresponding hole glue on the second frame.

16 Claims, 5 Drawing Sheets

BACKLIGHT MODULE AND LIQUID CRYSTAL DISPLAY DEVICE

RELATED APPLICATIONS

This application is a National Phase of PCT Patent Application No. PCT/CN2017/080949 having International filing date of Apr. 18, 2017, which claims the benefit of priority of Chinese Patent Application No. 201710159776.1 filed on Mar. 17, 2017. The contents of the above applications are all incorporated by reference as if fully set forth herein in their entirety.

FIELD AND BACKGROUND OF THE INVENTION

This disclosure relates to display technology, and more particularly to a backlight module and liquid crystal display device.

Currently, liquid crystal display devices have become increasingly popular. The clarity requirements of the liquid crystal display device are getting higher and higher. However, with the increased resolution of the liquid crystal display device, the heat dissipation problem increasingly becomes a prominent problem.

In a conventional liquid crystal display panel, a heat dissipation element is generally disposed in the liquid crystal display device to dissipate heat released by the chip operating in the liquid crystal display and heat released by the light source module in the backlight module. However, since the heat dissipation area of the heat dissipation element is too small, the heat released from the operation of the chip in the liquid crystal display device and the heat released from the light source module in the backlight module cannot be effectively reduced to below the safe temperature value, thereby causing the chip to be damaged and causing backlight module fluctuations.

Thus, it is necessary to provide a backlight module and liquid crystal display device to solve the problems of the prior art.

SUMMARY OF THE INVENTION

The object of this disclosure is to provide a backlight module and liquid crystal display device for increasing the area of the heat dissipation element to achieve a better cooling effect, and further for improving the stability of the backlight module.

This disclosure provides a backlight module, which comprises:

a plastic frame including a first frame and a second frame disposed opposite each other and a third frame and a fourth frame for connecting the first frame and the second frame;

a reflection sheet disposed on a bottom surface of the plastic frame;

a light guide plate disposed on the reflection sheet;

a light source element disposed on an inner side surface of the first frame;

a hole glue adhered to an upper surface of the plastic frame; and a heat dissipating element disposed on the light source element, extending along an outer side surface of the first frame to a bottom portion of the reflection sheet, and being bonded to the corresponding hole glue on the second frame;

the hole glue comprising: a first side portion adhered to the second frame, a second side portion adhered to the third frame, and a third side portion adhered to the fourth frame;

the heat dissipating element comprising: a first bonding portion, a second bonding portion, and an adhesive portion disposed between the first bonding portion and the second bonding portion, and the adhesive portion is bonded to the reflection sheet through a fixation effect of the first bonding portion and the second bonding portion.

In the backlight module of this disclosure, bonding lines are disposed at a boundary between the first bonding portion and the adhesive portion and at a boundary between the second bonding portion and the adhesive portion.

In the backlight module of this disclosure, the first bonding portion is bonded to the light source element, and the second bonding portion is bonded to the hole glue corresponding to the second frame.

In the backlight module of this disclosure, the heat dissipating element is a graphite sheet or a copper-aluminum foil.

This disclosure further provides a backlight module, which comprises:

a plastic frame including a first frame and a second frame disposed opposite each other and a third frame and a fourth frame for connecting the first frame and the second frame;

a reflection sheet disposed on a bottom surface of the plastic frame;

a light guide plate disposed on the reflection sheet;

a light source element disposed on an inner side surface of the first frame;

a hole glue adhered to an upper surface of the plastic frame; and a heat dissipating element disposed on the light source element, extending along an outer side surface of the first frame to a bottom portion of the reflection sheet, and being bonded to the corresponding hole glue on the second frame.

In the backlight module of this disclosure, the hole glue comprises a first side portion adhered to the second frame, a second side portion adhered to the third frame, and a third side portion adhered to the fourth frame.

In the backlight module of this disclosure, the heat dissipating element comprises a first bonding portion, a second bonding portion, and an adhesive portion disposed between the first bonding portion and the second bonding portion, and the adhesive portion is bonded to the reflection sheet through a fixation effect of the first bonding portion and the second bonding portion.

In the backlight module of this disclosure, bonding lines are disposed at a boundary between the first bonding portion and the adhesive portion and at a boundary between the second bonding portion and the adhesive portion.

In the backlight module of this disclosure, the first bonding portion is bonded to the light source element, and the second bonding portion is bonded to the hole glue corresponding to the second frame.

In the backlight module of this disclosure, the heat dissipating element is a graphite sheet or a copper-aluminum foil.

According to the object of this disclosure, this disclosure further provides a liquid crystal display device including a backlight module and a liquid crystal display panel fixed on the backlight module, the backlight module comprises:

a plastic frame including a first frame and a second frame disposed opposite to each other and a third frame and a fourth frame for connecting the first frame and the second frame;

a reflection sheet disposed on a bottom surface of the plastic frame;

a light guide plate disposed on the reflection sheet;

a light source element disposed on an inner side surface of the first frame;

a hole glue adhered to an upper surface of the plastic frame; and a heat dissipating element disposed on the light source element, extending along an outer side surface of the first frame to a bottom portion of the reflection sheet, and being bonded to the corresponding hole glue on the second frame.

In the liquid crystal display device of this disclosure, the hole glue comprises a first side portion adhered to the second frame, a second side portion adhered to the third frame, and a third side portion adhered to the fourth frame.

In the liquid crystal display device of this disclosure, the heat dissipating element comprises a first bonding portion, a second bonding portion, and an adhesive portion disposed between the first bonding portion and the second bonding portion, and the adhesive portion is bonded to the reflection sheet through a fixation effect of the first bonding portion and the second bonding portion.

In the liquid crystal display device of this disclosure, the heat dissipating element is a graphite sheet or a copper-aluminum foil.

In the liquid crystal display device of this disclosure, bonding lines are disposed at a boundary between the first bonding portion and the adhesive portion and at a boundary between the second bonding portion and the adhesive portion.

In the liquid crystal display device of this disclosure, the first bonding portion is bonded to the light source element, and the second bonding portion is bonded to the hole glue corresponding to the second frame.

The backlight module and liquid crystal display device of this disclosure disclose that the heat dissipating element disposed on the light source element, extending along the outer side surface of the first frame to the bottom portion of the reflection sheet, and is bonded to the hole glue corresponding to the second frame, thereby increasing the area of the heat dissipating element to achieve a better cooling effect, and further improving the stability of the backlight module. Moreover, the heat dissipating element disposed on the reflection sheet and the reflection sheet are free from any bonding, thereby greatly reducing the risk of backlight module fluctuation due to the difference in the expansion and contraction between the adhesive, the reflection sheet and the heat dissipating element.

For a better understanding of the aforementioned content of the present disclosure, preferable embodiments are illustrated in accordance with the attached figures for further explanation:

BRIEF DESCRIPTION OF THE SEVERAL VIEWS OF THE DRAWINGS

The accompanying drawings are made for the purpose of illustrating the general principles of this disclosure and are used to describe and understand the advantageous effects of this disclosure, obviously.

DESCRIPTION OF SPECIFIC EMBODIMENTS OF THE INVENTION

In order to more clearly illustrate the embodiments of the present invention or the technical solutions in the prior art, the following briefly introduces the accompanying drawings used in the embodiments. Obviously, the drawings in the following description merely show some of the embodiments of the present invention. As regards one of ordinary skill in the art, other drawings can be obtained in accordance with these accompanying drawings without making creative efforts.

Figure 1:
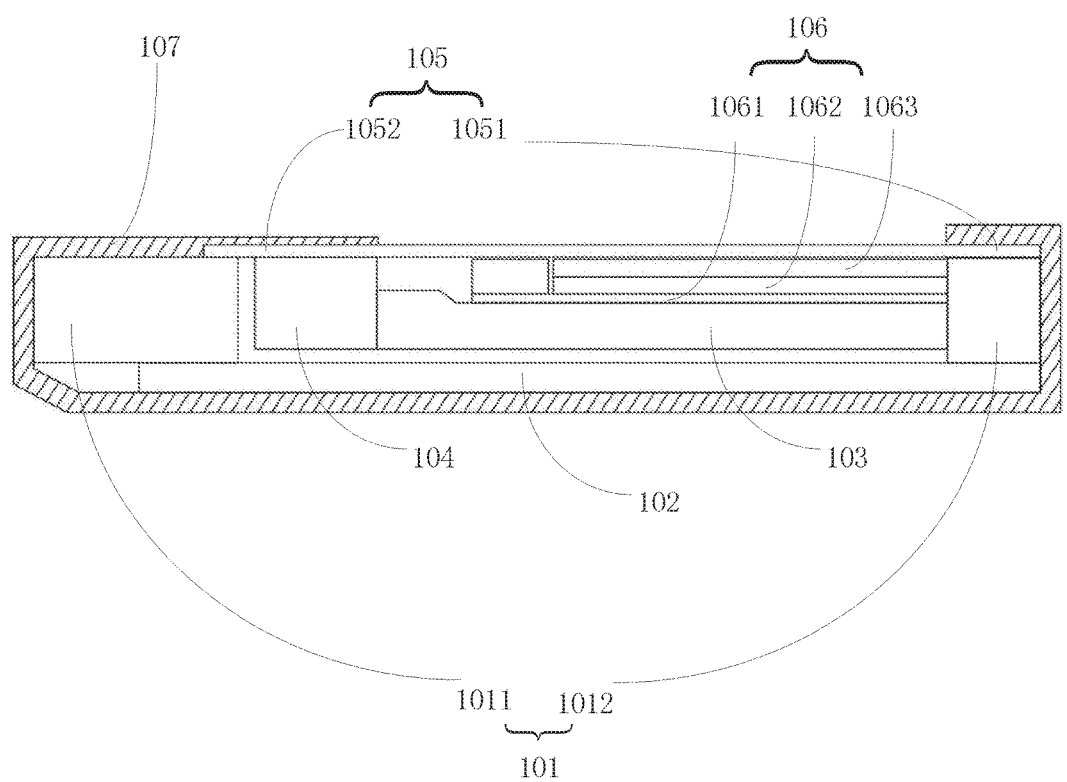
FIG. 1 is a schematic structural view of a backlight module according to a preferred embodiment of this disclosure.
Figure 2:
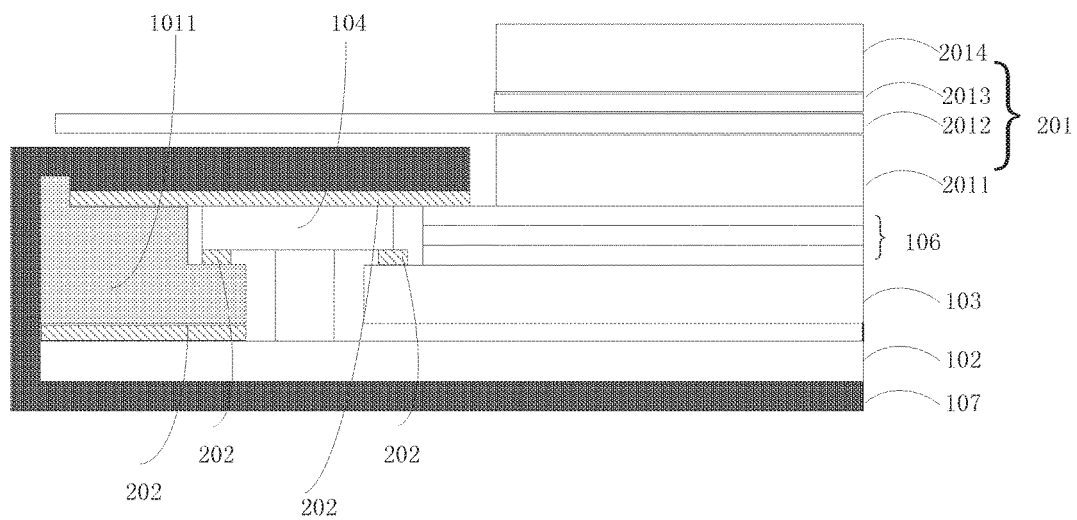
FIG. 2 is a schematic structural view of one light source side of the backlight module according to the preferred embodiment of this disclosure.

Refer to FIG. 1, which is a schematic structural view of a backlight module according to a preferred embodiment of this disclosure. As shown in FIG. 2, the backlight module of the preferred embodiment comprises a plastic frame 101, a reflection sheet 102, a light guide plate 103, a light source element 104, a hole glue 105, an optical film set 106 and a heat dissipating element 107. The plastic frame 101 includes a first frame 1011 and a second frame 1012 disposed opposite each other and a third frame (not shown) and a fourth frame (not shown) for connecting the first frame 1011 and the second frame 1012. The reflection sheet 102 is disposed on a bottom surface of the plastic frame 101. The light guide plate 103 is disposed on the reflection sheet 102. The light source element 104 is disposed on an inner side surface of the first frame 1011. The hole glue 105 is adhered to an upper surface of the plastic frame 101. The optical film set 106 includes a diffusion sheet 1061, a lower prism sheet 1062, and an upper prism sheet 1063, which are sequentially disposed above the light guide plate 103. The heat dissipating element 107 is disposed on the light source element 104, extending along an outer side surface of the first frame 1011 to a bottom portion of the reflection sheet 102, and is bonded to the corresponding hole glue 1051 on the second frame 1012. It is to be noted that the heat dissipating element 107 in the present preferred embodiment covers an intermediate region of an upper surface of the first frame 1011 so that the intermediate region of the upper surface of the first frame 1011 is in the same plane as both end regions. In the preferred embodiment, a hole glue 1052 corresponding to the intermediate region of the upper surface of the first frame 1011 is removed.

Figure 3:
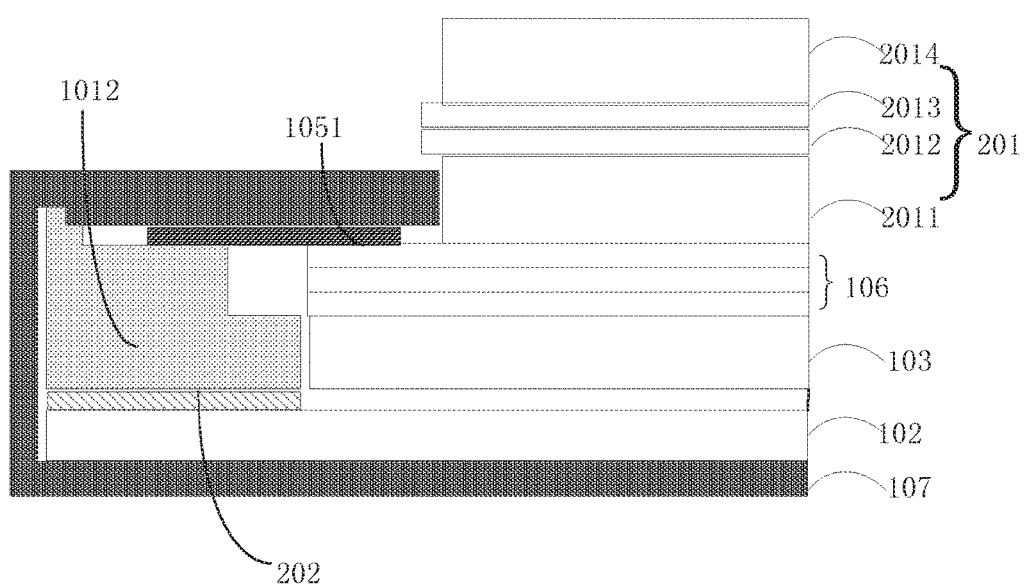
FIG. 3 is a schematic structural view of the other light source side of the backlight module according to the preferred embodiment of this disclosure.

Specifically, refer to FIGS. 2-3, FIG. 2 is a schematic structural view of one light source side of the backlight module according to the preferred embodiment of this disclosure, and FIG. 3 is a schematic structural view of the other light source side of the backlight module according to the preferred embodiment of this disclosure. Refer to FIGS. 1-3, the reflection sheet 102 is disposed on the bottom surface of the plastic frame 101, and is adhered to the bottom surface of the plastic frame 101 through an adhesive layer 202. The optical film set 106 is disposed above the light guide plate 103 and is sequentially adhered to the light source element 104 and the plastic frame 101 through the adhesive layer 202. The light source element 104 is disposed on the inner side surface of the first frame 1011 and is fixed between the plastic frame 101 and the light guide plate 103 through the adhesive layer 202. It is well known to those skilled in the art that the adhesive layer 202 for fixing the light source element 104 and the optical film set 106 is a conventional double-sided adhesive or shading double-sided adhesive. The thickness and material of the adhesive layer 202 are well known to those skilled in the art.

A liquid crystal panel 201 is disposed above the optical film set 106. The liquid crystal panel 201 comprises a lower polarizing sheet 2011, a lower glass sheet 2012, an upper glass sheet 2013, and an upper polarizing sheet 2014 from the bottom to the top. A soft circuit board, an IC chip and other electronic components (not shown) are disposed on an area of the lower glass sheet 2012 facing the light source element.

Furthermore, the heat dissipating element 107 is bonded to the light source element 104 through the adhesive layer 202 on the light source element 104 and the adhesive layer 202 on the first frame 1011, and extends along the outer side surface of the first frame 1011 to the bottom portion of the reflection sheet 102. It is to be noted that one end portion of the heat dissipating element 107 is fixed by the adhesive layer 202 located on the light source element 104 and the adhesive layer 202 located on the first frame 1011, and the other end portion is bonded and fixed by the corresponding hole glue 1051 bonded to the second frame 1012. The heat dissipating elements 107 located in the intermediate region are in close contact with the reflection sheet 102, but do not adhere to the reflection sheet 102 through the adhesive layer 202. The heat dissipating elements 107 located in the intermediate region are bonded to the reflection sheet 102 through a fixing action of both ends of the heat dissipating element 107. This makes the heat dissipating elements 107 located on the reflection sheet 102 free from any bonding to the reflection sheet 102, greatly reducing the risk of the backlight module fluctuation due to the difference in the expansion and contraction between the material of the adhesive layer, the reflection sheet, and the heat dissipating element. Moreover, the process of attaching the double-sided adhesive can be omitted during assembling for improving the assembly efficiency.

Figure 4:
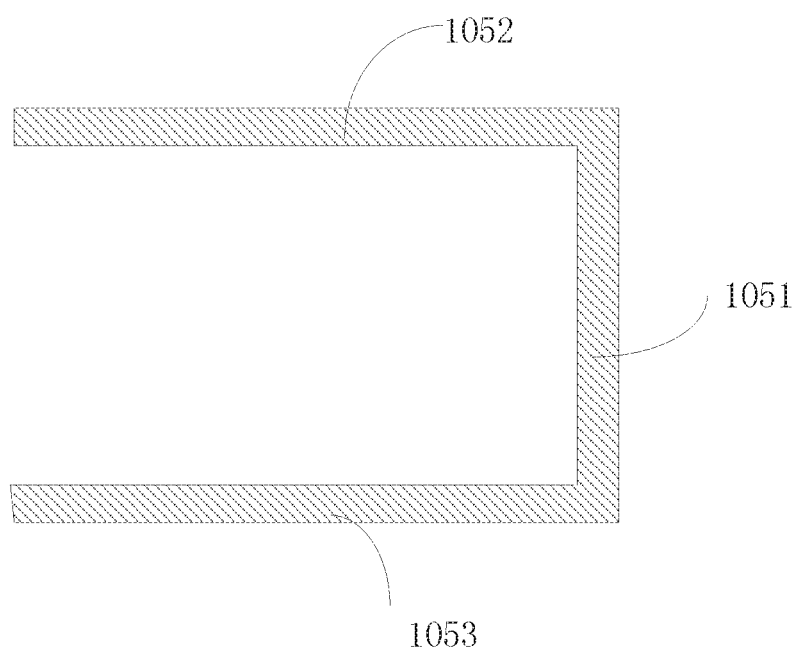
FIG. 4 is a schematic structural view of a hole glue of the backlight module according to the preferred embodiment of this disclosure.

Refer to FIG. 4, which is a schematic structural view of a hole glue of the backlight module according to the preferred embodiment of this disclosure. Refer to FIG. 1 and FIG. 4, the hole glue 105 comprises a first side portion 1051 of the hole glue, a second side portion 1052 of the hole glue and, a third side portion 1053 of the hole glue. The first side portion 1051 is adhered to the second frame 1012. The second side portion 1052 is adhered to the third frame. The third side portion 1053 is adhered to the fourth frame.

In the preferred embodiment, the hole glue 105 forms a "U" type hole glue from the first side portion 1051, the second side portion 1052, and the third side portion 1053 so that the upper surface of the first frame 1011 is further flattened after the heat dissipating element 107 is added.

Figure 5:
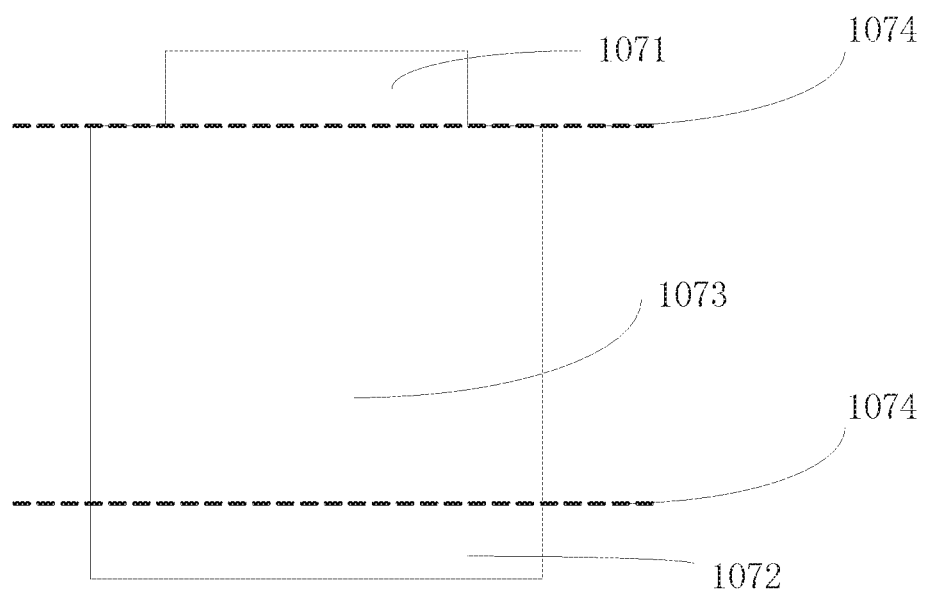
FIG. 5 is a schematic structural view of a heat dissipating element of the backlight module according to the preferred embodiment of this disclosure.

Refer to FIG. 5, which is a schematic structural view of a heat dissipating element of the backlight module according to the preferred embodiment of this disclosure. Refer to FIG. 1 and FIG. 5, the heat dissipating element 107 comprises a first bonding portion 1071, a second bonding portion 1072 and an adhesive portion 1073 disposed between the first bonding portion 1071 and the second bonding portion 1072. The adhesive portion 1073 is bonded to the reflection sheet 102 through a fixation effect of the first bonding portion 1071 and the second bonding portion 1072, so that the heat dissipating element 107 and the reflection sheet 102 are not bonded by providing the adhesive material on the reflection sheet 102. Thus, it prevents the risk of the backlight module fluctuation due to the difference in the expansion and contraction between the adhesive material, the reflection sheet 102 and the heat dissipating element 107.

Furthermore, bonding lines 1074 are disposed at a boundary between the first bonding portion 1071 and the adhesive portion 1073 and at a boundary between the second bonding portion 1072 and the adhesive portion 1073. It makes allows operator to easily install the heat dissipating element according to the bonding line 1074 during module installation. The first bonding portion 1071 is bonded to the light source element 104, and the second bonding portion 1072 is bonded to the corresponding hole glue 1051 on the second frame 1012.

Preferably, the heat dissipating element 107 is a graphite sheet or a copper-aluminum foil.

The backlight module of the preferred embodiment provides that the heat dissipating element disposed on the light source element, extending along the outer side surface of the first frame to the bottom portion of the reflection sheet, and is bonded to the hole glue corresponding to the second frame, thereby increasing the area of the heat dissipating element to achieve a better cooling effect, and further improving the stability of the backlight module. Moreover, the heat dissipating element disposed on the reflection sheet and the reflection sheet are free from any bonding, thereby greatly reducing the risk of the backlight module fluctuation due to the difference in the expansion and contraction between the adhesive, the reflection sheet, and the heat dissipating element.

This disclosure further provides a liquid crystal display device including a backlight module and a liquid crystal display panel fixed on the backlight module. The backlight module comprises a plastic frame including a first frame and a second frame disposed opposite each other and a third frame and a fourth frame for connecting the first frame and the second frame, a reflection sheet disposed on a bottom surface of the plastic frame, a light guide plate disposed on the reflection sheet, a light source element disposed on an inner side surface of the first frame, a hole glue adhered to an upper surface of the plastic frame, and a heat dissipating element disposed on the light source element, extending along an outer side surface of the first frame to a bottom portion of the reflection sheet, and being bonded to the corresponding hole glue on the second frame.

Preferably, the hole glue comprises a first side portion adhered to the second frame, a second side portion adhered to the third frame, and a third side portion adhered to the fourth frame.

Preferably, the heat dissipating element comprises a first bonding portion, a second bonding portion and an adhesive portion disposed between the first bonding portion and the second bonding portion, and the adhesive portion is bonded to the reflection sheet through a fixation effect of the first bonding portion and the second bonding portion.

Preferably, bonding lines are disposed at a boundary between the first bonding portion and the adhesive portion and at a boundary between the second bonding portion and the adhesive portion.

Preferably, the first bonding portion is bonded to the light source element, and the second bonding portion is bonded to the hole glue corresponding to the second frame.

Preferably, the heat dissipating element is a graphite sheet or a copper-aluminum foil.

The liquid crystal display device of the preferred embodiment provides that the heat dissipating element disposed on the light source element, extending along the outer side surface of the first frame to the bottom portion of the reflection sheet, and is bonded to the hole glue corresponding to the second frame, thereby increasing the area of the heat dissipating element to achieve a better cooling effect, and further improving the stability of the backlight module. Moreover, the heat dissipating element disposed on the reflection sheet and the reflection sheet are free from any bonding, thereby greatly reducing the risk of backlight module fluctuation due to the difference in the expansion and contraction between the adhesive, the reflection sheet and the heat dissipating element.

This disclosure has been described with preferred embodiments thereof, and it is understood that many changes and modifications to the described embodiment can be carried out without departing from the scope and the spirit of the invention that is intended to be limited only by the appended claims.

What is claimed is:

1. A backlight module, comprising:
   a plastic frame comprising a first frame and a second frame disposed opposite each other, and a third frame and a fourth frame for connecting the first frame and the second frame;
   a reflection sheet disposed on a bottom surface of the plastic frame;
   a light guide plate disposed on the reflection sheet;
   a light source element disposed on an inner side surface of the first frame;
   a hole glue adhered to an upper surface of the plastic frame; and
   a heat dissipating element disposed on the light source element, extending along an outer side surface of the first frame to a bottom portion of the reflection sheet, and being bonded to the corresponding hole glue on the second frame;
   the hole glue comprising a first side portion adhered to the second frame, a second side portion adhered to the third frame, and a third side portion adhered to the fourth frame;
   the heat dissipating element comprising a first bonding portion, a second bonding portion and an adhesive portion disposed between the first bonding portion and the second bonding portion;
   wherein the adhesive portion is bonded to the reflection sheet through a fixation effect of the first bonding portion and the second bonding portion.

2. The backlight module according to claim 1, wherein bonding lines are disposed at a boundary between the first bonding portion and the adhesive portion and at a boundary between the second bonding portion and the adhesive portion.

3. The backlight module according to claim 1, wherein the first bonding portion is bonded to the light source element, and the second bonding portion is bonded to the hole glue corresponding to the second frame.

4. The backlight module according to claim 1, wherein the heat dissipating element is a graphite sheet or a copper-aluminum foil.

5. A backlight module, comprising:
   a plastic frame comprising a first frame and a second frame disposed opposite each other and a third frame and a fourth frame for connecting the first frame and the second frame;
   a reflection sheet disposed on a bottom surface of the plastic frame;
   a light guide plate disposed on the reflection sheet;
   a light source element disposed on an inner side surface of the first frame;
   a hole glue adhered to an upper surface of the plastic frame; and
   a heat dissipating element disposed on the light source element, extending along an outer side surface of the first frame to a bottom portion of the reflection sheet, and being bonded to the corresponding hole glue on the second frame.

6. The backlight module according to claim 5, wherein the hole glue comprises a first side portion adhered to the second frame, a second side portion adhered to the third frame, and a third side portion adhered to the fourth frame.

7. The backlight module according to claim 5, wherein the heat dissipating element comprises a first bonding portion, a second bonding portion and an adhesive portion disposed between the first bonding portion and the second bonding portion, and the adhesive portion is bonded to the reflection sheet through a fixation effect of the first bonding portion and the second bonding portion.

8. The backlight module according to claim 7, wherein bonding lines are disposed at a boundary between the first bonding portion and the adhesive portion and at a boundary between the second bonding portion and the adhesive portion.

9. The backlight module according to claim 7, wherein the first bonding portion is bonded to the light source element, and the second bonding portion is bonded to the hole glue corresponding to the second frame.

10. The backlight module according to claim 5, wherein the heat dissipating element is a graphite sheet or a copper-aluminum foil.

11. A liquid crystal display device including a backlight module and a liquid crystal display panel fixed on the backlight module, the backlight module comprising:
    a plastic frame including a first frame and a second frame disposed opposite each other and a third frame and a fourth frame for connecting the first frame and the second frame;
    a reflection sheet disposed on a bottom surface of the plastic frame;
    a light guide plate disposed on the reflection sheet;
    a light source element disposed on an inner side surface of the first frame;
    a hole glue adhered to an upper surface of the plastic frame; and
    a heat dissipating element disposed on the light source element, extending along an outer side surface of the first frame to a bottom portion of the reflection sheet, and being bonded to the corresponding hole glue on the second frame.

12. The liquid crystal display device according to claim 11, wherein the hole glue comprises a first side portion adhered to the second frame, a second side portion adhered to the third frame, and a third side portion adhered to the fourth frame.

13. The liquid crystal display device according to claim 11, wherein the heat dissipating element comprises a first bonding portion, a second bonding portion and an adhesive portion disposed between the first bonding portion and the second bonding portion, and the adhesive portion is bonded to the reflection sheet through a fixation effect of the first bonding portion and the second bonding portion.

14. The liquid crystal display device according to claim 11, wherein the heat dissipating element is a graphite sheet or a copper-aluminum foil.

15. The liquid crystal display device according to claim 13, wherein bonding lines are disposed at a boundary between the first bonding portion and the adhesive portion and at a boundary between the second bonding portion and the adhesive portion.

16. The liquid crystal display device according to claim 13, wherein the first bonding portion is bonded to the light source element, and the second bonding portion is bonded to the hole glue corresponding to the second frame.

* * * * *